United States Patent [19]
Hattori et al.

[11] 3,919,164
[45] Nov. 11, 1975

[54] PROCESS FOR EXTRUDING THERMOPLASTIC RESIN COMPOSITION CONTAINING A HIGH INORGANIC FILLER CONTENT

[75] Inventors: Takeo Hattori; Yoshio Hoya; Atsushi Maeda, all of Yokkaichi, Japan

[73] Assignee: Mitsubishi Petrochemical Co., Ltd., Tokyo, Japan

[22] Filed: Mar. 19, 1973

[21] Appl. No.: 342,435

[30] Foreign Application Priority Data
Mar. 23, 1972 Japan.................. 47-29289

[52] U.S. Cl. ........... 260/42; 260/42.43; 260/42.46; 260/42.49; 260/42.56; 264/141; 264/176 R; 264/209
[51] Int. Cl.² .... C08K 3/00; C08K 5/00; B28B 3/20
[58] Field of Search ........ 264/349, 211, 37, 122, 264/150, 209, 176 R, 75, 141, 142, 143; 260/42, 42.43, 42.46, 42.49, 42.56

[56] References Cited
UNITED STATES PATENTS

| | | | |
|---|---|---|---|
| 2,477,170 | 7/1949 | Broderson et al. | 264/75 |
| 2,497,346 | 2/1950 | Collins | 106/198 |
| 2,960,724 | 11/1960 | Sack et al. | 264/349 |
| 3,228,997 | 1/1966 | Armstrong et al. | 264/75 |
| 3,275,591 | 9/1966 | Tomlinson | 260/41 |
| 3,342,901 | 9/1967 | Kosinsky et al. | 264/349 |
| 3,388,196 | 6/1968 | Farrell | 264/176 R |
| 3,418,270 | 12/1968 | Traub | 260/41 |
| 3,457,216 | 7/1969 | Den | 260/42.46 |
| 3,553,158 | 1/1971 | Gilfillan | 264/211 |
| 3,584,096 | 6/1971 | Kassouni et al. | 264/122 |

FOREIGN PATENTS OR APPLICATIONS

| | | | |
|---|---|---|---|
| 1,261,661 | 2/1968 | Germany | 264/349 |

OTHER PUBLICATIONS
"Effect of Talc Filler on the Melt Rheology of Polypropylene," Chapman et al., SPE Journal Jan. 1970, Vol. 26 pp. 37–40.

*Primary Examiner*—Robert F. White
*Assistant Examiner*—James B. Lowe
*Attorney, Agent, or Firm*—Oblon, Fisher, Spivak, McClelland & Maier

[57] ABSTRACT

An extruded thermoplastic resin composition containing 30–90% by weight of an inorganic filler which comprises admixing relatively large particles of a thermoplastic resin with a fine powder mixture of a thermoplastic resin and an inorganic filler.

7 Claims, No Drawings

3,919,164

PROCESS FOR EXTRUDING THERMOPLASTIC RESIN COMPOSITION CONTAINING A HIGH INORGANIC FILLER CONTENT

BACKGROUND OF THE INVENTION

1. Field of the Invention

This invention relates to a process for uniformly extruding a thermoplastic resin composition containing a high inorganic filler content from a screw type extruder.

2. Description of the Prior Art

It has been found that when a thermoplastic resin powder such as isotactic polypropylene, high density polyethylene or polyvinylchloride is mixed with a large amount of inorganic filler in a melt-extrusion apparatus with a screw type extruder such as a single axial screw type extruder or a biaxial screw type extruder, passage of the mixture at the feed portion of the screw type extruder is not smooth, productivity is very low, and the fluctuations of the extruded mass increase with the changes in the passage of the mixture. Thus, the pellets prepared from a mixture in a screw type extruder have the disadvantage of having an irregular shape and the tendency to incorporate foam into the pellets formed. Also, it has been difficult to mold sheets or pipes from mixtures of the powders by directly melt-extruding the mixtures without preparing pellets. Articles prepared by a direct extrusion-molding process have had the disadvantage of uneven appearances, great thickness, incorporation of foam into the articles or partial deformation of the articles. These disadvantages are significantly increased depending upon the increase in the quantities of the inorganic filler incorporated.

In order to overcome these disadvantages, it has been proposed to employ force feeders which forcibly feed mixtures of the powders, or to employ a multiaxial screw type extruder. However, these procedures have not been able to overcome these disadvantages. Accordingly, in order to mold the compound mixtures of a thermoplastic resin having a high inorganic filler content in the form of sheets, pipes and the other articles, compound-mixtures have been prepared in batch type mixers such as a Bumbury's mixer or a mixing roller which require much labor and skill. In addition, the compound-mixtures have been shaped in extruders, injection devices, presses and the other apparatus.

If the inorganic filler content is less than 30% by weight, pellets have been prepared with a single axial screw type extruder having a force feeder. Also, sheets, pipes and other molded articles have been directly prepared by melt-extruding a mixture of polyvinylchloride powder containing a small inorganic filler content. Therefore, it has been difficult to conduct the extrusion of mixtures containing more than 30% by weight inorganic filler by conventional screw extrusion methods.

A need, therefore, exists for a method for smoothly extruding resin mixtures containing a relatively high inorganic filler content.

SUMMARY OF THE INVENTION

Accordingly, one object of this invention is to provide a process for extruding a thermoplastic resin composition having a high inorganic filler content with a highly efficient screw type extruder in comparison to other conventional processes.

Another object of this invention is to provide a process for extruding a thermoplastic resin composition containing a high inorganic filler content to yield uniform pellets or molded articles containing no indications of foaming by smoothing the passage of the resin mixtures from the feed portion of the extruder and by preventing fluctuations in the passage of the resin mixtures from the extruder.

Yet another object of this invention is to provide a process for extruding a thermoplastic resin composition with a high inorganic filler content to directly form sheets, pipes and other moldered articles, without the intermediate preparation of pellets of the resin mixture.

Briefly, these objects and other objects of this invention as hereinafter will become readily apparent can be attained by providing a process for extruding a thermoplastic resin composition containing 30 – 90 weight % inorganic filler which comprises feeding a mixture of relatively large particles of a thermoplastic resin with a fine powder mixture of a thermoplastic resin and an inorganic filler.

DETAILED DESCRIPTION OF THE PREFERRED EMBODIMENTS

For the extrusion of the resin mixtures of this invention thermoplastic resin powders having fine particle sizes and inorganic fillers having particle sizes similar to those used in conventional processes are used. However, in accordance with this invention, relatively large particles such as pellets, granules, crushed pieces and the like of the thermoplastic resin are admixed with a fine powder mixture of a thermoplastic resin and an inorganic filler which has a suitable fluidity.

Suitable thermoplastic resins used in the process of this invention include isotactic polypropylene, high or medium density polyethylene, copolymers of propylene-ethylene, polyvinyl-chloride polystyrene and the like. These resins may be prepared by bulk polymerization, emulsion polymerization, suspension polymerization or solution polymerization procedures. The resins prepared usually are powders having a particle size diameter less than 100$\mu$. Suitable inorganic fillers include talc, calcium carbonate, titanium oxide, barium sulphate, asbestos, diatomaceous earth, clays, and silicas which have a particle size diameter of about 0.1 to 30$\mu$.

If the inorganic filler content of the composition is less than 30% by weight, it is possible to extrude the resin composition by conventional extruding methods which employ a force-feeder or a multiaxial extruder. On the other hand, if the inorganic filler content is more than 90% by weight, the resulting product is brittle, and cannot be used. The relatively large particles of the thermoplastic resin used for the process of this invention can be the same or different from said thermoplastic resin powder used in the fine powder mixture.

It is possible to use relatively large particles of the thermoplastic resin containing an inorganic filler as said relatively large particles of the thermoplastic resin. The quantity of the inorganic filler used in the relatively large particles can be the same as or different from that of said fine powder mixture. It is also possible to incorporate a different type of inorganic filler in the relatively large particles. The particle size diameter of said relatively large particles is preferably such that the particles pass through a 20 mm × 20 mm screen, but do not pass through a 1 mm × 1 mm screen.

The particle size of the fine powder of the thermoplastic resin is preferably 20 to 32 mesh. The ratio of the volume of the relatively large particles of the thermoplastic resin to that of the fine powder of the thermoplastic resin is usually in the range of 10 – 10,000, preferably 40 – 8,000. If a product which incorporates the inorganic filler in a completely uniform condition is required, it is preferable to admix relatively large particles of one type of thermoplastic resin with an inorganic filler in equal amounts with the same type of fine powder resin-inorganic filler mixture. However, molded articles having a special appearance can be prepared when relatively large particles of a resin-inorganic filler mixture are admixed with a fine powder mixture containing a different type of filler or resin.

In the process of this invention, the amount of relatively large particles of the thermoplastic resin admixed in the composition, in order to improve the passage of the mixture from the feeder, should be increased depending upon the increased quantity of inorganic filler used. Usually 5 – 50 parts by weight, preferably 8 – 30 parts by weight of the relatively large particle resin composition to 100 parts by weight of the fine powder mixture of the resin and the inorganic filler is used.

The process for extruding the composition according to this invention can be conducted even in a single screw type extruder. However, it is preferable to conduct the extrusion on a multiaxial screw type extruder such as a biaxial screw type extruder. It is also possible to vibrate the hopper of said screw-type extruder, or to agitate the mixture with a rod in the hopper to facilitate the passage of the mixture from the hopper. The operating conditions such as the velocity, temperature and the like of the melt-extruder can be selected depending upon the type of components of the composition, and the characteristics of the extruder.

In accordance with the process of this invention, it is possible to provide a highly efficient preparation of the compound-mixture of a thermoplastic resin containing an inorganic filler in comparison to the conventional batch systems, and also to eliminate the mixing roller operation of the conventional processes which requires a high degree of skill. Moreover, even when the content of the inorganic filler is greater than 60% by weight, it is possible to directly extrude resin mixtures to form a melt-extrusion molding by eliminating the compound-mixing step in the preparation of sheets, pipes, and other molded articles.

In accordance with the process of this invention, it is possible to overcome the disadvantages of the prior art process in that a smooth passage of the resin mixtures from the feed portions of the screw type extruder can be accomplished, and the rate of extrusion can be increased. Further, the fluctuations of the extrusion which is caused by the unevenness of the passage of the mixture, can be greatly reduced.

Having generally discribed this invention, a further understanding can be obtained by reference to certain specific examples which are provided herein for purposes of illustration only and are not intended to be limiting unless otherwise specified.

EXAMPLE 1

The relatively large particles of a thermoplastic resin such as pellets and crushed pieces were admixed with a fine powder mixture of a thermoplastic resin and an inorganic filler. The total mixture was fed to the feeder of a screw type extruder as shown in the following table, and was melt-extruded to form pellets or to form a molded article at the extruding rates indicated in the table.

The screw type extruders employed were as follows:
1. Single axial screw type extruder [referred to as a single axial type]: The extruder was manufactured by Mitsubishi Heavy Industries Co., Ltd. and has an inner diameter of 90 mm and a ratio of length to diameter [L/D] of 28. The extrusion rate for polypropylene pellets was 140 – 170 kg/hour. The extrusion rate for polyvinylchloride pellets was 80–100 kg/hour.
2. Biaxial screw type extruder [DSM type ]: The extruder was manufactured by Japan Steel Works Co., Ltd. [DSM II/65] and has an inner diameter of 65 mm in the discharge zone.
3. Biaxial screw type extruder [ZSK-83 type ]: The extruder was manufactured by Werner Pfleiderer and has an inner diameter of 83 mm.

A Live-Bin screw feeder manufactured by Vibra Screw Feeder Co., Ltd. was used as a constant volume feeder for extruders [2] and [3].

In molding tests, a sheet having a thickness of 0.5 mm was used. Determination of the extruding rate, pelletizing properties, molding properties, and the fluctuation of the extrusion were made by the following methods.

1. Extruding rate test

Extrusion rates were measured by comparing the data received with the data obtained for the extrusion rates for the resins which contained no inorganic filler. The extrusion rate for the resin powder containing no inorganic filler was as follows:

| | |
|---|---|
| 1. Single axial type | 120 – 150 kg/hour |
| 2. Biaxial type [DSM II/65] | 130 – 150 kg/hour |
| 3. Biaxial type [ZSK — 83] | 80 – 110 kg/hour |

2. Pelletizing test

If the fluctuation of the extruded mixtures is less than ± 15%, suitable pellets could be obtained. The results of this invention can be best realized when the pelletizing properties are considered in view of the molding properties.

3. Molding test

If the fluctuation of the extrusion is less than ± 5%, molded articles could be directly prepared without an intermediate pelletizing step. [A sheet having a thickness of 0.5 mm was prepared.]

4. Fluctuation of extrusion

Fluctuations of the extrusion were measured by the fluctuations of the extrusion rate per minute and the fluctuations in the pressures of the die. Fluctuations in the thickness of the products such as sheets and pipes were also calculated.

5. The particle size of the fillers used are as follows:

| | | | |
|---|---|---|---|
| Talc | 5 – 20μ | average | 10μ |
| CaCO₃ | 0.5 – 3μ | average | 1μ |
| TiO₂ | 0.15 – 0.3μ | | |

| Extruder | Powder mixture | | | Relatively large particles of thermoplastic resin | | Extruding rate [kg/H] | Fluctuation of Extrusion [±%] | Results | |
|---|---|---|---|---|---|---|---|---|---|
| | resin | filler | filler-concentration wt% | Particle size Screen size [mm] | Amount wt. part | | | Pelletizing | Molding |
| single axial | polypropylene | talc | 20 | — | — | 120 | ±10.0 | 0 | X |
| biaxial | ″ | ″ | 25 | — | — | 150 | ±8.0 | 0 | X |
| single axial | ″ | ″ | 30 | — | — | 100 | ±19.0 | X | X |
| biaxial | ″ | ″ | 30 | — | — | 120 | ±17.0 | X | X |
| single axial | ″ | ″ | 30 | 8 | 20 | 120 | ±5.0 | 0 | 0 |
| ″ | ″ | CaCO₃ | 70 | — | — | 30 | ±45.0 | X | X |
| biaxial | ″ | ″ | 70 | — | — | 70 | ±22.0 | X | X |
| biaxial | ″ | ″ | 70 | — | — | 40 | ±26.0 | X | X |
| biaxial | ″ | ″ | 70 | 8 | 20 | 170 | ±7.0 | 0 | X |
| biaxial | ″ | ″ | 70 | 8 | 20 | 110 | ±8.0 | 0 | X |
| single axial | ″ | ″ | 70 | 8 | 20 | 120 | ±13.0 | 0 | X |
| biaxial | ″ | ″ | 50 | rod 8 | 20 | 145 | ±4.3 | 0 | 0 |
| ″ | ″ | ″ | 50 | rod 8 | 20 | 165 | ±4.5 | 0 | 0 |
| ″ | ″ | ″ | 50 | rod 8 | 20 | 170 | ±3.5 | 0 | 0 |
| biaxial | ″ | ″ | 60 | 0.05 | 20 | 40 | ±18.0 | X | X |
| ″ | ″ | ″ | 60 | 2 | 20 | 90 | ±5.0 | 0 | 0 |
| ″ | ″ | ″ | 60 | 15 | 20 | 100 | ±4.5 | 0 | 0 |
| biaxial | ″ | ″ | 60 | 22 | 20 | 60 | ±17.0 | X | X |
| biaxial | polypropylene | TiO₂ | 50 | 10 | 3 | 90 | ±19.0 | X | X |
| ″ | ″ | ″ | 50 | 10 | 5 | 140 | ±5.5 | 0 | 0 |
| ″ | ″ | ″ | 50 | 10 | 20 | 150 | ±3.0 | 0 | 0 |
| ″ | ″ | ″ | 50 | 10 | 45 | 150 | ±4.5 | 0 | 0 |
| ″ | ″ | ″ | 50 | 10 | 60 | 100 | ±18.0 | X | X |
| ″ | ethylene-propylene copolymer | CaCO₃ | 50 | 8 | 20 | 150 | ±5.0 | 0 | 0 |
| ″ | high density polyethylene | ″ | 50 | 8 | 20 | 160 | ±5.5 | 0 | 0 |
| ″ | polyvinylchloride | ″ | 50 | 8 | 20 | 180 | ±3.0 | 0 | 0 |
| ″ | polypropylene | ″ | 95 | 8 | 20 | — | — | *1 X | *1 X |
| single axial | ″ | ″ | 30 | 8 | 5 | 120 | ±5.0 | 0 | 0 |
| ″ | ″ | ″ | 90 | 8 | 20 | 185 | ±8.5 | 0 | X |
| ″ | ″ | ″ | 90 | 1 | 5 | 175 | ±10.5 | 0 | X |
| ″ | ″ | ″ | 90 | 1 | 50 | 185 | ±9.5 | 0 | X |
| ″ | ″ | ″ | 90 | 20 | 5 | 175 | ±13.5 | 0 | X |
| ″ | ″ | ″ | 90 | 20 | 55 | 120 | ±21.0 | X | X |
| ″ | ″ | ″ | 90 | 20 | 50 | 185 | ±12.0 | 0 | X |
| biaxial | ″ | ″ | 60 | high density polyethylene 8 | 20 | 175 | ±11.5 | 0 | X |
| ″ | ″ | (talc TiO₂) 40 10 | | 8 | 20 | 175 | ±4.5 | 0 | 0 |

*1 The resulting composition was brittle and could not be molded because the strands were severed when pelletized and the films were severed when molded.
**2 The thermoplastic resin used for the resin powder was the same as the relatively large particles of the resin in experiments 1 – 34.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for extruding a thermoplastic resin composition containing 30–90 % by weight of an inorganic filler which comprises:

mixing from 5–50 parts by weight of large particles of a thermoplastic resin having an average particle diameter greater than 1,000 μ with 100 parts by weight of a fine powder mixture of a thermoplastic resins having an average particle diameter of 0.1 – 100 μ and which is 20–32 mesh and an inorganic filler; and extruding said mixture.

2. The process according to claim 1, wherein said relatively large particles of the thermoplastic resin are pellets, granules, crushed pieces of the thermoplastic resin or mixtures thereof, and wherein said relatively large particles are capable of passing through a 20 mm × 20 mm screen but do not pass through a 1 mm × 1 mm screen.

3. The process according to claim 1, wherein the large particles comprise a thermoplastic resin and an inorganic filler.

4. The process according to claim 1, wherein a multiaxial extruder is employed and the total mixture of said large particles and said fine powder mixture is continuously fed to the hopper of the extruder.

5. The process according to claim 1, wherein the total mixture of said large particles and said powder mixture is extruded to form molded articles.

6. The process according to claim 1, wherein the thermoplastic resin used in said large particles is the same as the thermoplastic resin used in said fine powder mixture.

7. The process according to claim 1, wherein the thermoplastic resin used in said large particles is different from the thermoplastic resin used in said fine powder mixture.

* * * * *